3,066,009
PREPARATION OF DECABORANYL SODIUM
Theodore L. Heying, Tonawanda, N.Y., assignor to Olin Mathieson Chemical Corporation, a corporation of Virginia
No Drawing. Filed Jan. 15, 1959, Ser. No. 787,088
2 Claims. (Cl. 23—14)

This invention relates to the preparation of solid compounds of the class $B_{10}H_{13}M$ wherein M is an alkali metal, such as sodium or potassium. More in particular, this invention relates to the preparation of compounds of the class $B_{10}H_{13}M$ by the direct reaction of an alkali metal hydride and decaborane while they are in admixture with an alkyl halide having 1 to 3 carbon atoms in the alkyl radical. The reaction is generally conducted at a temperature of 15° to 35° C. Ethyl bromide is the preferred alkyl halide although other alkyl halides such as methyl bromide, methyl chloride, ethyl chloride, n-propyl bromide, n-propyl chloride, isopropyl bromide, isopropyl chloride, and the like can be used.

The compound decaboranyl sodium $NaB_{10}H_{13}$ is a white non-volatile hygroscopic solid which has a melting point above 300° C. It is soluble in tetrahydrofuran, diethylether and dioxane without alteration. It is soluble in water at room temperature with some decomposition. Approximately 75 percent of the decaborane can be recovered by acidification of this water solution. A solution of decaboranyl sodium in diethyl ether is light yellow. A solution in tetrahydrofuran is a deep yellow and a solution in ethyl bromide is practically colorless.

The decaboranyl alkali metal compounds can be incorporated with suitable oxidizers such as ammonium perchlorate, potassium perchlorate, sodium perchlorate, lithium perchlorate, aluminum perchlorate, ammonium nitrate, etc., to yield solid propellants suitable for rocket power plants and other jet propelled devices. Such propellants burn with high flame speeds, have high heats of combustion and are of the high specific impulse type. The decaboranyl alkali metal compounds, when incorporated with oxidizers, are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following example illustrates this invention.

*Example I*

This experiment was performed in a 50 ml. three neck round bottom flask fitted with a reflux condenser, which was cooled by circulating water, a dropping funnel and a drying tube containing Ascarite (a sodium hydroxide-asbestos absorbent).

Sodium hydride, 0.2 g., was slurried in 10 ml. of ethyl bromide and to this was added 1.0 g. of decaborane in 15 ml. of ethyl bromide at room temperature. A reaction occurred with liberation of a gas, hydrogen, and a flocculent white precipitate formed. This white solid was filtered from the solution and washed with two 10 ml. portions of ethyl bromide. The solid was pumped under vacuum until dry, and 0.5 gram of a fluffy white product was obtained. An analysis of this material showed that it contained 67.5 percent boron, 15.0 percent sodium, 2.4 percent carbon and 8.4 percent hydrogen. The calculated percentages for $NaB_{10}H_{13}$ are 75.0 percent boron, 15.97 percent sodium and 9.01 percent hydrogen.

The solution obtained from the filtration of the above white solid was evaporated under vacuum and an additional 0.5 gram of decaboranyl sodium contaminated with a trace of decaborane was recovered.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing the boron-containing solid materials, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the boron-containing material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron-containing material. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:
1. A method for the preparation of decaboranyl sodium of the formula $NaB_{10}H_{13}$ which comprises reacting sodium hydride and decaborane while the reactants are in admixture with an alkyl halide having 1 to 3 carbon atoms in the alkyl group, and thereafter recovering the decaboranyl sodium from the reaction mixture.
2. The method of claim 1 wherein the alkyl halide is ethyl bromide.

References Cited in the file of this patent
UNITED STATES PATENTS
2,545,633    Schlesinger _____ Mar. 20, 1951

OTHER REFERENCES
Stock: "Zanorg. Allgem. Chem.," vol. 228, pages 178–192 (1936).
Schlesinger et al.: "J. Am. Chem. Soc.," vol. 75, page 187 (1953).